May 16, 1967
C. ROMEO
3,319,509
WING NUT
Filed April 26, 1965
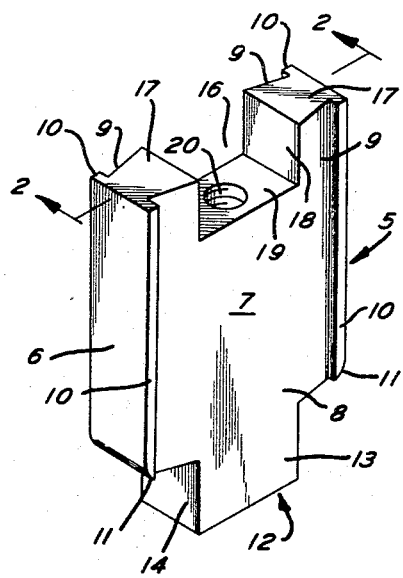
FIG.1
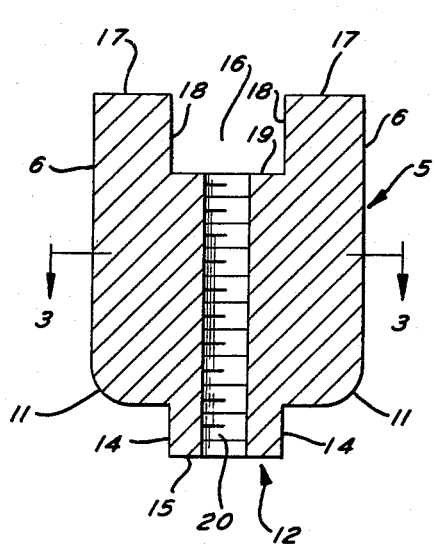
FIG.2
FIG.3
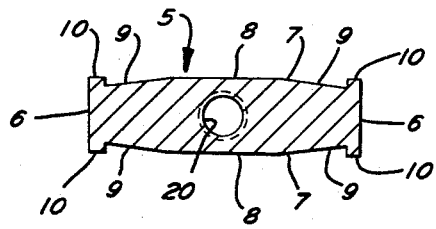
INVENTOR.
COSTANTINO ROMEO
BY
ATTORNEY 3,319,509
WING NUT
Costantino Romeo, 2227 S. 10th St.,
Philadelphia, Pa. 19148
Filed Apr. 26, 1965, Ser. No. 450,686
1 Claim. (Cl. 85—32)

This invention relates to wing nuts.

Various wing nuts have heretofore been proposed but these have had various objectionable features. One of the common forms of wing nut has the wings projecting in a manner so that articles such as wiping cloths can be caught thereon.

Many of the prior wing nuts are relatively expensive to make and particularly if the body is to be of synthetic plastic material.

It is the principal object of the present invention to provide an improved wing nut which can be made at relatively low cost, is easy to operate with reduced tendency to slippage and which is free from objectionable projections.

It is a further object of the present invention to provide a wing nut with which a screwdriver or the like can be employed for tightening and for loosening the same if desired.

It is a further object of the present invention to provide a wing nut which can be made of stock substantially rectangular in cross section but which will be relatively free from slipping upon manual manipulation thereof.

Other objects and advantageous features of the invention will be apparent from the description and claim.

The nature and characteristic features of the invention will be more readily understood from the following description taken in connection with the accompanying drawings forming part thereof, in which:

FIGURE 1 is an enlarged view in perspective of a wing nut in accordance with the invention;

FIG. 2 is a longitudinal sectional view taken approximately on the line 2—2 of FIG. 1; and FIG. 3 is a transverse sectional view taken approximately on the line 3—3 of FIG. 2.

It should, of course, be understood that the description and drawing herein are illustrative merely, and that various modifications and changes can be made in the structure disclosed without departing from the spirit of the invention.

Referring now more particularly to the drawings, the wing nut in accordance with the invention preferably includes a body 5 which can be made of any desired material, the synthetic plastic known as nylon being particularly suitable although metal such as steel, brass, bronze or aluminum could be employed, if desired.

The body 5 is shown as substantially rectangular in cross section, over the greater part of its length, of a width about three and a third times its thickness, with opposite parallel edge marginal faces 6 and opposite side faces 7 with central flat face portions 8 and longitudinally extending opposite converging side grooves 9 extending to end flat portions 10 which meet the faces 6.

The body 5 has rounded edge portions 11 and, extending therebeyond, has an integral projection or extension 12 bounded by flat face portions 13 which are continuations of the central flat face portions 8 and by edge marginal faces 14, inset from the faces 6.

The body 5 at one end and at the termini of the faces 14 and face portions 13 has an end face 15 which engages the surface (not shown) against which the nut bears.

At the other end of the body 5 a central slot 16 is provided extending inwardly from end face portion 17, and bounded by spaced side faces 18 and an inner face 19 parallel to the end face portions 17.

The distance between the side faces 18 is preferably greater than one third of the distance between the edge faces 6, and preferably slightly greater than the distance between the edge marginal faces 14 to permit the use, if desired of a plurality of wing nuts of the invention in tandem on the same threaded shank.

The length of the body 5 from the end face portions 17 and excluding the projection 12 is the same as the width between the faces 6.

An internally threaded opening 20 extends from the face 19 to the end face 15 for engagement with a threaded shank (not shown) on which it is used.

The nut, applied on a threaded shank (not shown) can be turned by hand to tighten the same, the grooves 9 facilitating gripping the nut without slipping. The face 15 is brought into engagement with the surface which it is to engage. The shape of the body facilitates the manual manipulation.

If further tightening is desired on a short threaded shank a screwdriver may be inserted in the slot and diagonally between the side faces 18 and a turning force applied by the screwdriver. If further tightening is desired on a longer threaded shank a screwdriver may be inserted between the shank and one of the side faces 18 and a turning force applied.

The nut can be loosened by application of force in the opposite direction and in the same manner.

I claim:

A nut comprising
an integral elongated body of substantially rectangular cross section and of a width greater than about three times its thickness,
said body being bounded by spaced opposite parallel outer edge faces,
spaced opposite outer side faces, and opposite parallel outer end portions,
said body having extending between said end portions an internally threaded opening,
said body having extending inwardly from one end an actuating slot bounded by flat parallel inner side faces terminating at an inner face of the same width as the space between said inner side faces,
said inner side faces being spaced inwardly from said parallel side faces and the width of the slot being not less than one-third of the distance between said opposite edge faces,
said outer side faces spaced inwardly from each of the outer edge faces each having flat central portions and converging grooves disposed inwardly of said outer edge faces,
said body portion having an integral extension at the end thereof opposite said slot of a width substantially the same as that of the slot,
said grooves providing longitudinal ledges along their outer margins.

References Cited by the Examiner

UNITED STATES PATENTS

| | | | |
|---|---|---|---|
| 1,798,812 | 3/1931 | Rosenbeck | 85—32 |
| 2,281,482 | 4/1942 | Crayton | 85—32 |
| 2,390,325 | 12/1945 | Rapp | 85—32 |
| 2,862,537 | 12/1958 | Poupitch | 85—32 |

EDWARD C. ALLEN, *Primary Examiner.*

CARL W. TOMLIN, *Examiner.*

R. S. BRITTS, G. A. MILWICK, *Assistant Examiners.*